US008408568B2

(12) United States Patent
Yanagida

(10) Patent No.: US 8,408,568 B2
(45) Date of Patent: Apr. 2, 2013

(54) SUSPENSION APPARATUS

(75) Inventor: Takuya Yanagida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 13/115,056

(22) Filed: May 24, 2011

(65) Prior Publication Data
US 2011/0291379 A1 Dec. 1, 2011

(30) Foreign Application Priority Data

May 28, 2010 (JP) ................................ 2010-123075

(51) Int. Cl.
*B60G 3/00* (2006.01)
*B60G 3/18* (2006.01)
(52) U.S. Cl. ..... 280/124.128; 280/124.13; 280/124.135; 280/124.148; 280/124.15; 280/124.153
(58) Field of Classification Search ........... 280/124.116, 280/124.128, 124.13, 124.133, 124.135, 280/124.136, 124.138, 124.143, 124.144, 280/124.148, 124.15, 124.153
See application file for complete search history.

(56) References Cited

U.S. PATENT DOCUMENTS

| | | | | |
|---|---|---|---|---|
| 4,790,560 A | * | 12/1988 | Asanuma et al. | 280/124.128 |
| 4,840,396 A | * | 6/1989 | Kubo | 280/124.143 |
| 4,930,805 A | * | 6/1990 | Takata et al. | 280/124.128 |
| 5,000,477 A | * | 3/1991 | Minakawa et al. | 280/124.136 |
| 6,357,772 B1 | * | 3/2002 | Pelz et al. | 280/124.143 |
| 6,945,547 B2 | * | 9/2005 | Ackley et al. | 280/124.143 |
| 7,896,372 B2 | * | 3/2011 | Yanagida | 280/124.135 |
| 7,984,915 B2 | * | 7/2011 | Post et al. | 280/5.524 |
| 2004/0100062 A1 | * | 5/2004 | Inoue et al. | 280/124.135 |

FOREIGN PATENT DOCUMENTS

JP 2008-195296 8/2008

* cited by examiner

*Primary Examiner* — Ruth Ilan
(74) *Attorney, Agent, or Firm* — Ditthavong Mori & Steiner, P.C.

(57) ABSTRACT

A suspension apparatus includes a first suspension arm having a front end section pivotally supported on a vehicle body. The first suspension arm extends toward a rear of a vehicle from the front end section. A second suspension arm has an outer end section and an inner end section. The outer end section is attached to the first suspension. The inner end section is disposed at an inner side of the outer end section in a vehicle width direction and is pivotally supported on the vehicle body. An elastic joining section is provided on the second suspension arm and connects the second suspension arm to the first suspension arm with a plurality of elastic bodies disposed substantially in parallel in the vehicle width direction. A knuckle is supported by the first suspension arm and the wheel and is supported between the plurality of elastic bodies.

4 Claims, 13 Drawing Sheets

Fr ⟷ Rr

Fr ⟷ Rr

FIG. 9A
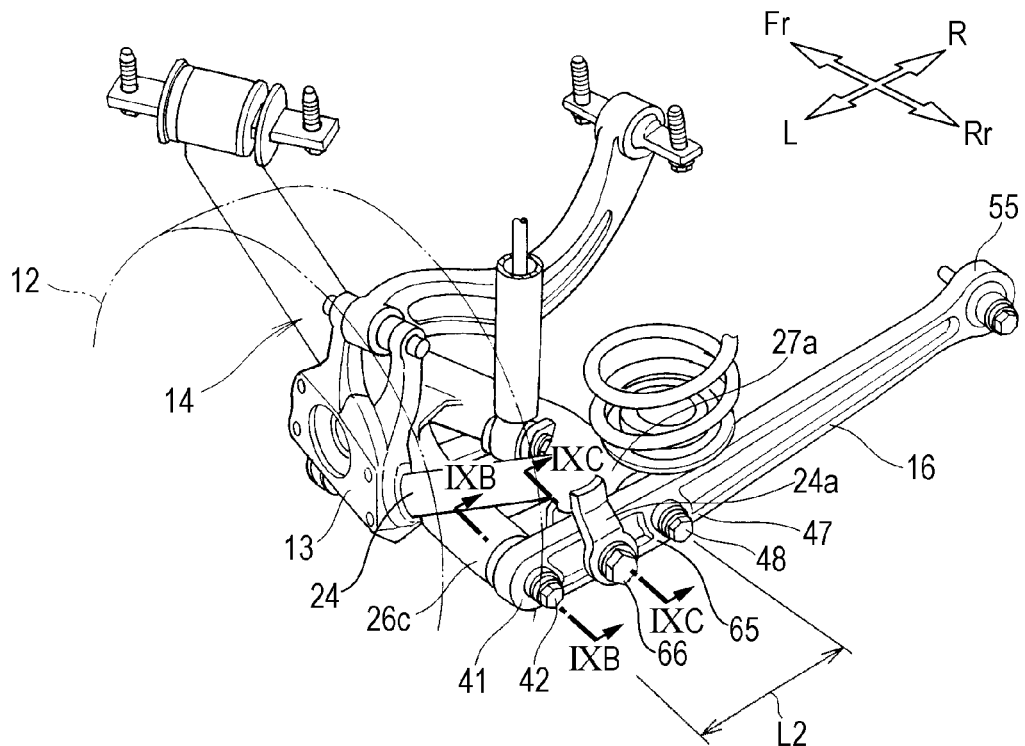
FIG. 9B
FIG. 9C
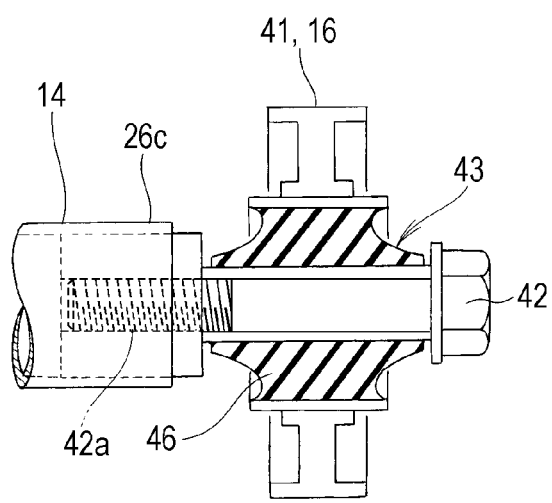

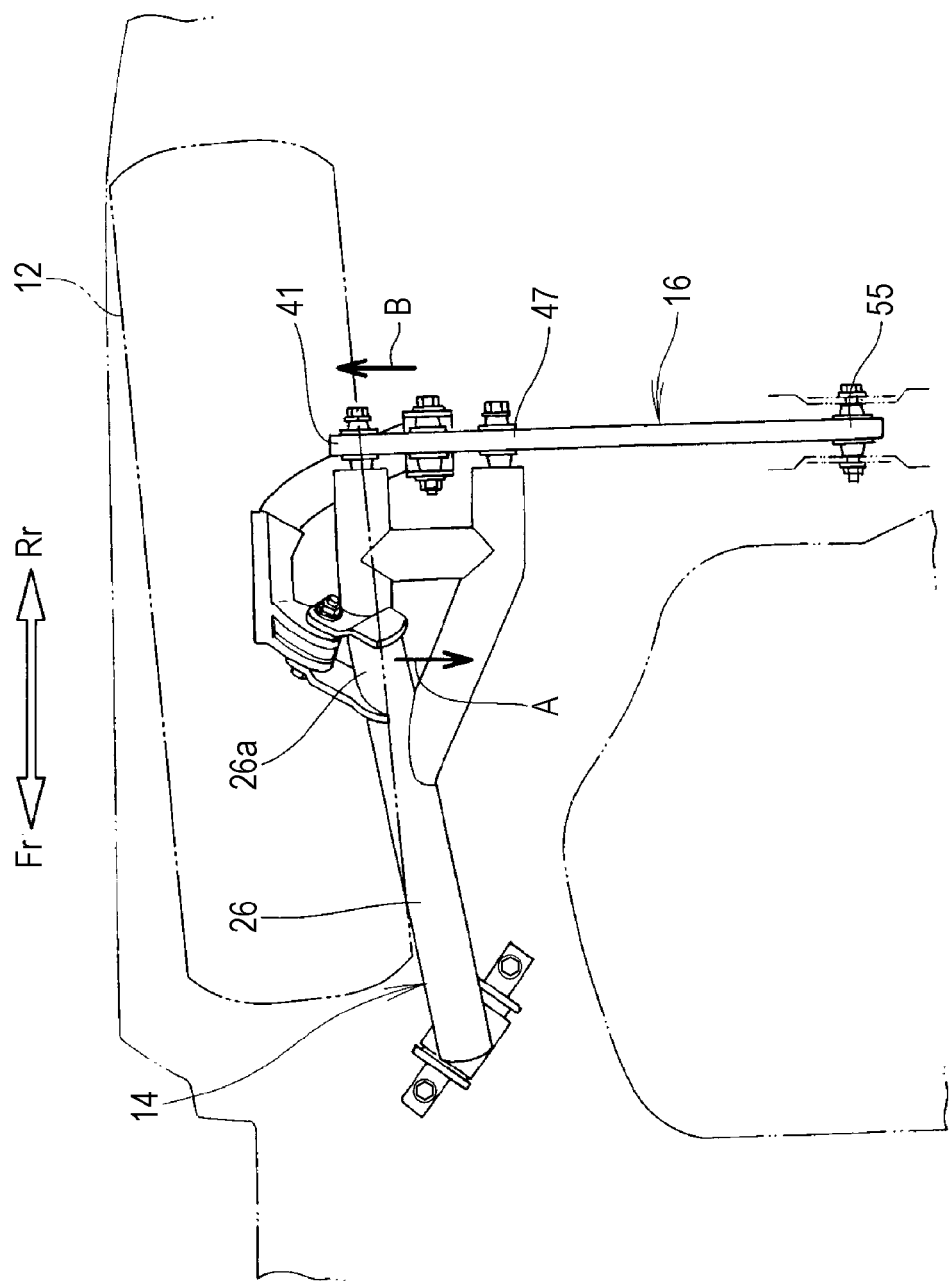

SUSPENSION APPARATUS

CROSS-REFERENCE TO RELATED APPLICATIONS

The present application claims priority under 35 U.S.C. §119 to Japanese Patent Application No. 2010-123075, filed May 28, 2010, entitled "Suspension Apparatus". The contents of this application are incorporated herein by reference in their entity.

BACKGROUND OF THE INVENTION

1. Field of the Invention

The present invention relates to a suspension apparatus.

2. Description of the Related Art

In some suspension apparatuses, a knuckle is joined with the vehicle body with an upper arm and a trailing arm, the trailing arm joined with the knuckle is joined with the lower arm, and a wheel is supported on the knuckle in a freely turning manner.

In such suspension apparatuses, the lower arm is disposed along the vehicle width direction, and the outer end section is joined with the rear end section of the trailing arm with first and second joints.

The first and second jointing sections are disposed parallel to each other with a predetermined distance between them in the vehicle width direction, and elastically deformable rubber bushes are disposed such that their axes are arranged along the front-to-rear direction of the vehicle.

The rubber bushes are disposed such that their axes are arranged along the front-to-rear direction to allow elastic deformation in the front-to-rear direction of the vehicle. Accordingly, elastic compliance (allowing deformation and displacement to a certain degree for an input) in the front-to-rear direction of the vehicle is ensured.

In this way, for example, when the wheel runs over a bump while driving the vehicle, ride comfort can be improved by ensuring elastic compliance in the front-to-rear direction of the vehicle.

Elastic deformation of the rubber bushes in the direction orthogonal to the bush axes (i.e., vehicle width direction) is prevented. Accordingly, toe (toe angle) and camber (camber angle) of the wheel can be suitably maintained by maintaining rigidity in the vehicle width direction.

By suitably maintain the toe and camber of the wheel while driving the vehicle in this way, driving stability can be improved (for example, refer to Japanese Unexamined Patent Application Publication No. 2008-195296).

SUMMARY OF THE INVENTION

According to one aspect of the present invention, a suspension apparatus includes a first suspension arm, a second suspension arm, an elastic joining section, and a knuckle. The first suspension arm has a front end section pivotally supported on a vehicle body. The first suspension arm extends toward a rear of a vehicle from the front end section. The second suspension arm has an outer end section and an inner end section. The outer end section is attached to the first suspension. The inner end section is disposed at an inner side of the outer end section in a vehicle width direction and is pivotally supported on the vehicle body. The elastic joining section is provided on the second suspension arm and connects the second suspension arm to the first suspension arm with a plurality of elastic bodies disposed substantially in parallel in the vehicle width direction. The knuckle is supported by the first suspension arm and the wheel and is supported between the plurality of elastic bodies.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9A, 9B, and 9C illustrate ride comfort and driving stability of a vehicle having the suspension apparatus according to the embodiment of the present invention;

FIG. 13 illustrates a case in which brake is applied to a wheel of a suspension apparatus according to the embodiment of the present invention.

DESCRIPTION OF THE EMBODIMENTS

Figure 1:
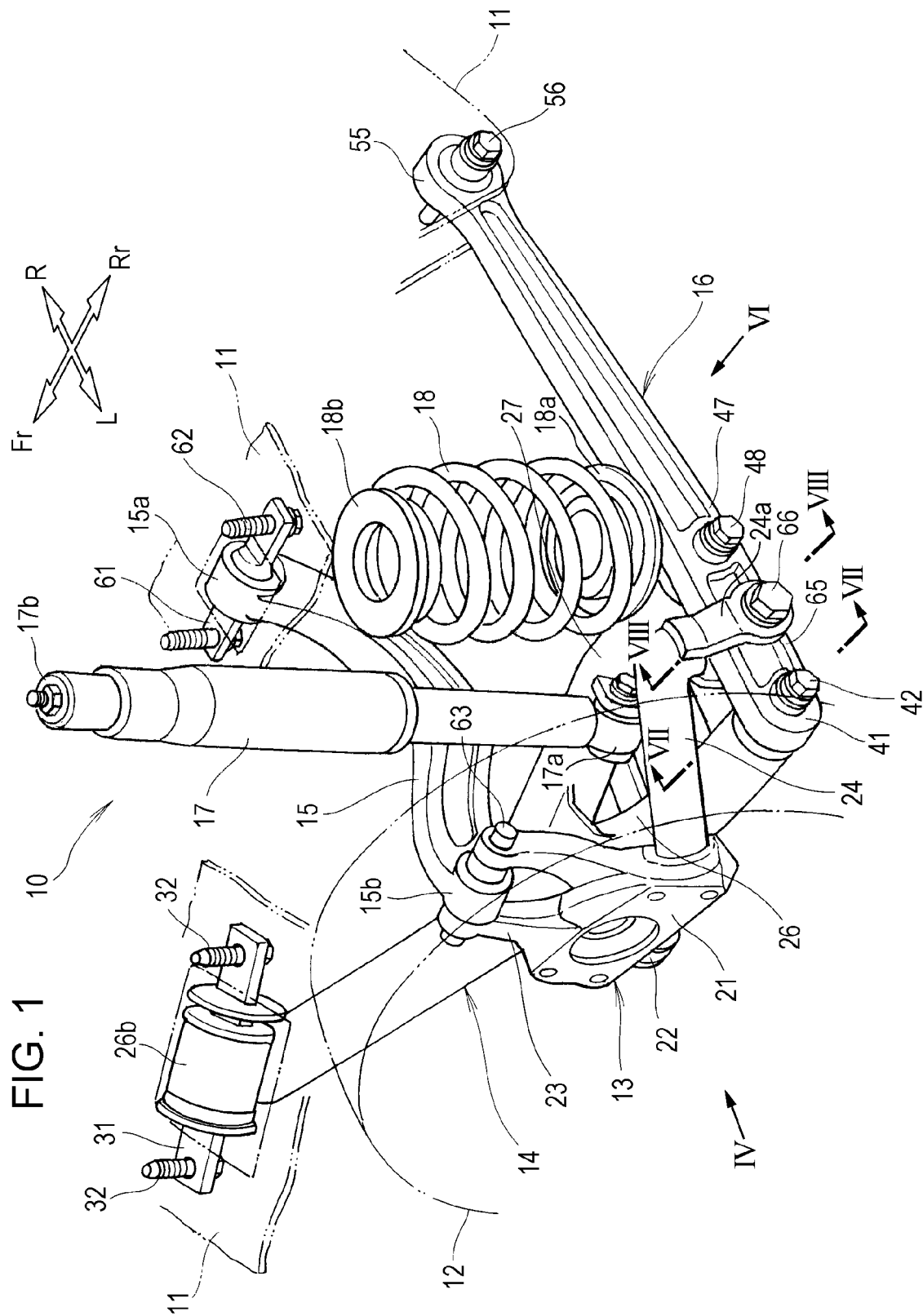
FIG. 1 is a perspective view of a suspension apparatus according to an embodiment of the present invention.

The embodiments of the present invention will be described below with reference to the accompanying drawings, wherein like reference numerals designate corresponding or identical elements throughout the various drawings. Fr, Rr, L, and R respectively represent front, rear, left, and right directions with respect to the drive.

Embodiment

A suspension apparatus 10 according to this embodiment will be described below.

As illustrated in FIG. 1, the suspension apparatus 10 includes a knuckle 13 that supports a wheel (rear wheel) 12 on an axle (not shown) in a freely rotating manner, a trailing arm 14 that supports the knuckle 13 at a lower front joining section 22, an upper arm 15 that supports the knuckle 13 at an upper joining section 23, a lower arm 16 that supports the knuckle 13 at a lower rear joining section 24, a damper 17 and a suspension spring 18 that support the trailing arm 14.

The trailing arm 14 is an example of a first suspension arm.

The lower arm 16 is an example of a second suspension arm.

Figure 2:
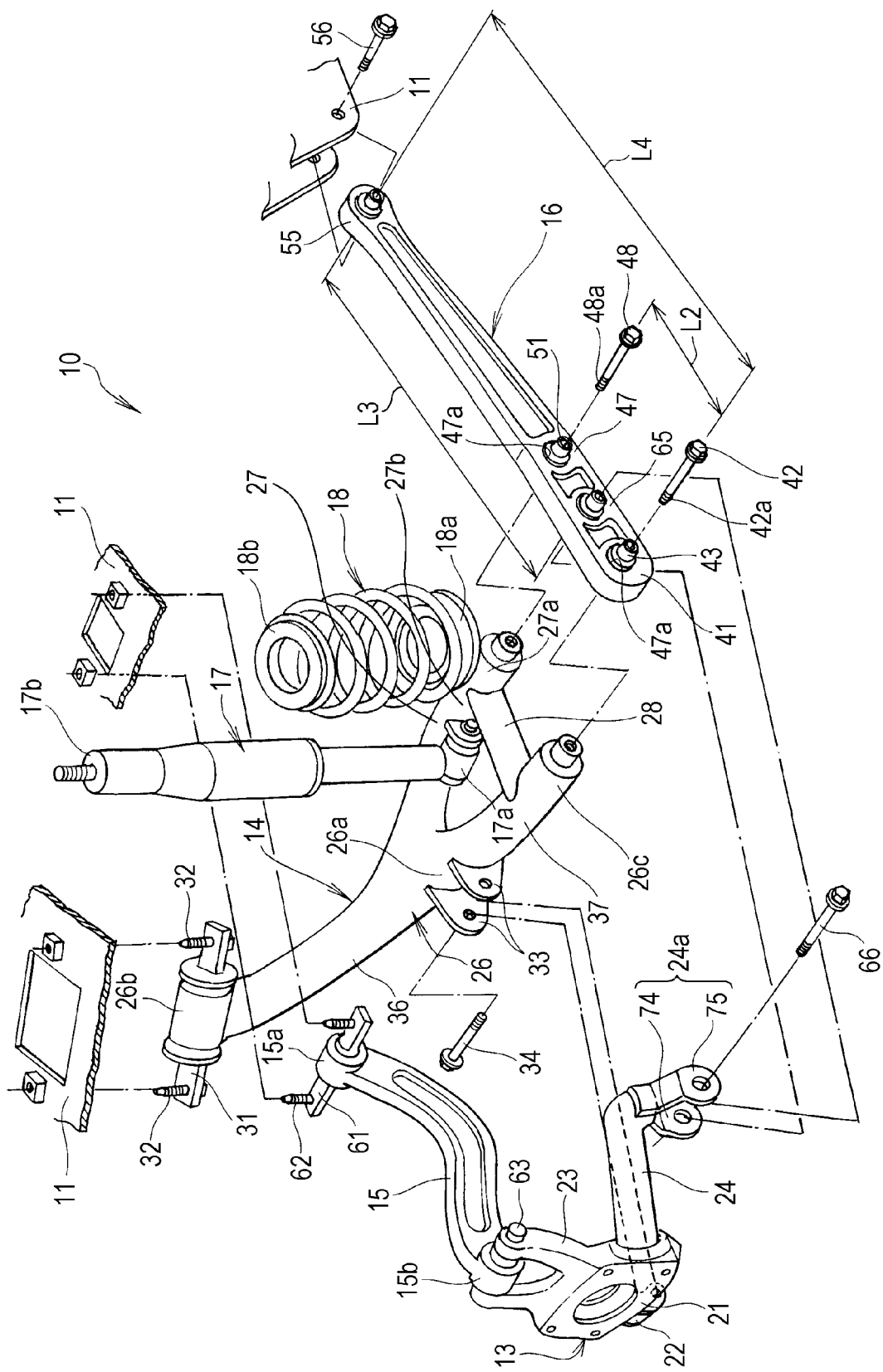
FIG. 2 is an exploded perspective view of the suspension apparatus illustrated in FIG. 1.
Figure 3:
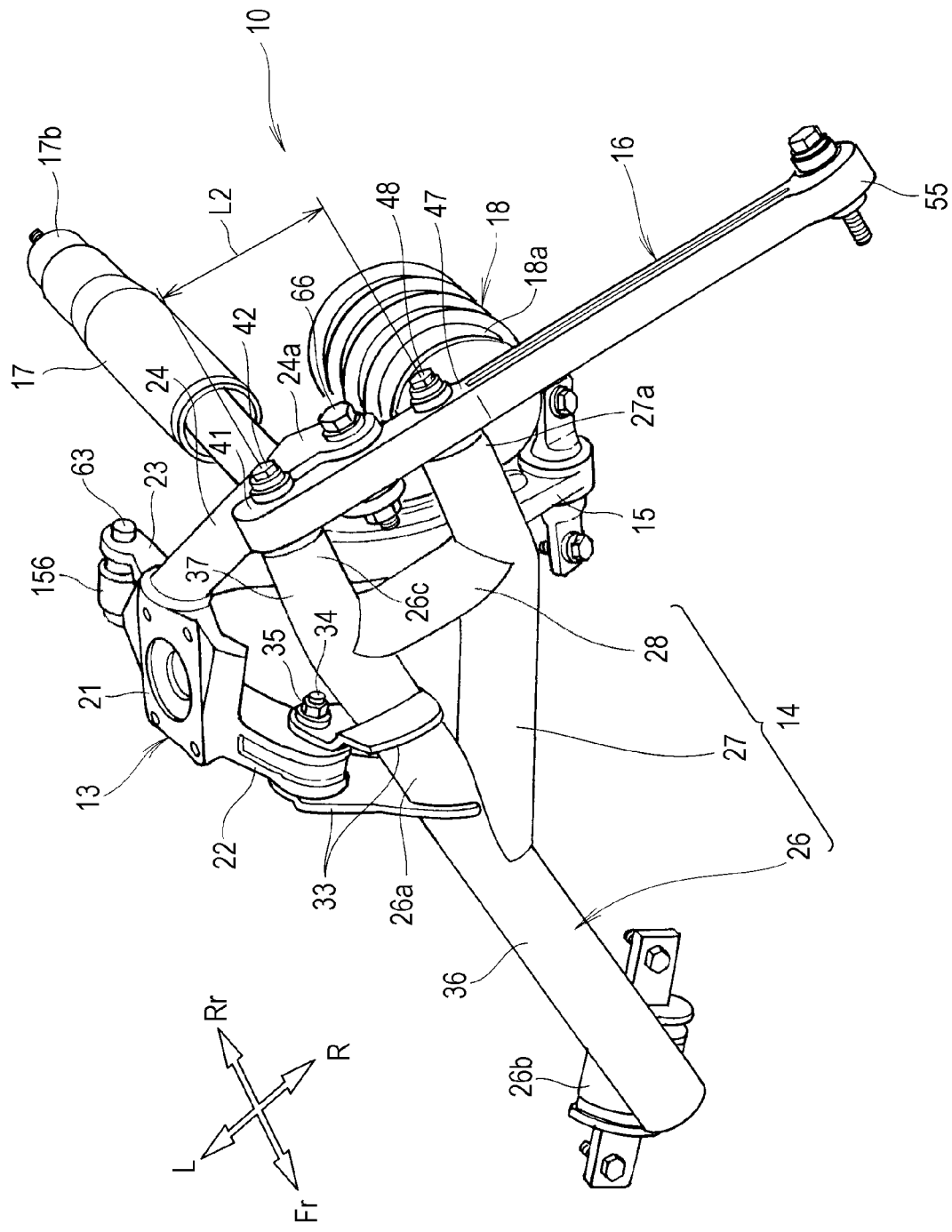
FIG. 3 is a perspective view from below the suspension apparatus illustrated in FIG. 1.

As illustrated in FIGS. 2 and 3, the knuckle 13 includes a knuckle main body 21 that supports the axle in a freely rotating manner, the lower front joining section 22 that extends downward from the front lower part of the knuckle main body 21, the upper joining section 23 that extends upward from the upper part of the knuckle main body 21, and the lower rear joining section 24 that extends along the vehicle width direction and toward the rear of the vehicle from the lower rear part of the knuckle main body 21.

The lower front joining section 22 is pivotally supported by the trailing arm 14, and the upper joining section 23 is pivotally supported by the upper arm 15. The lower rear joining section 24 is pivotally supported by the lower arm 16.

The trailing arm 14 includes a main arm 26 that extends along the front-to-rear direction of the vehicle, a subarm 27 that extends rearward from a main center section 26a of the main arm 26, and a crossing member 28 that connects the main arm 26 and the subarm 27.

A main front end section 26b of the main arm 26 is pivotally supported by a vehicle body 11 with a support shaft 31 and bolts 32. The lower front joining section 22 is pivotally attached to joining brackets 33 on the main center section 26a of the main arm 26 with a bolt 34 and a nut 35. A main rear end section 26c of the main arm 26 is connected to a first outer end section 41 of the lower arm 16 with a first bolt 42.

The main arm 26 includes a main inclined part 36 that extends rearward from the main front end section 26b to the main center section 26a and extends outward in the vehicle width direction and a main linear part 37 that extends rearward from the main center section 26a to the main rear end section 26c.

Figure 4:
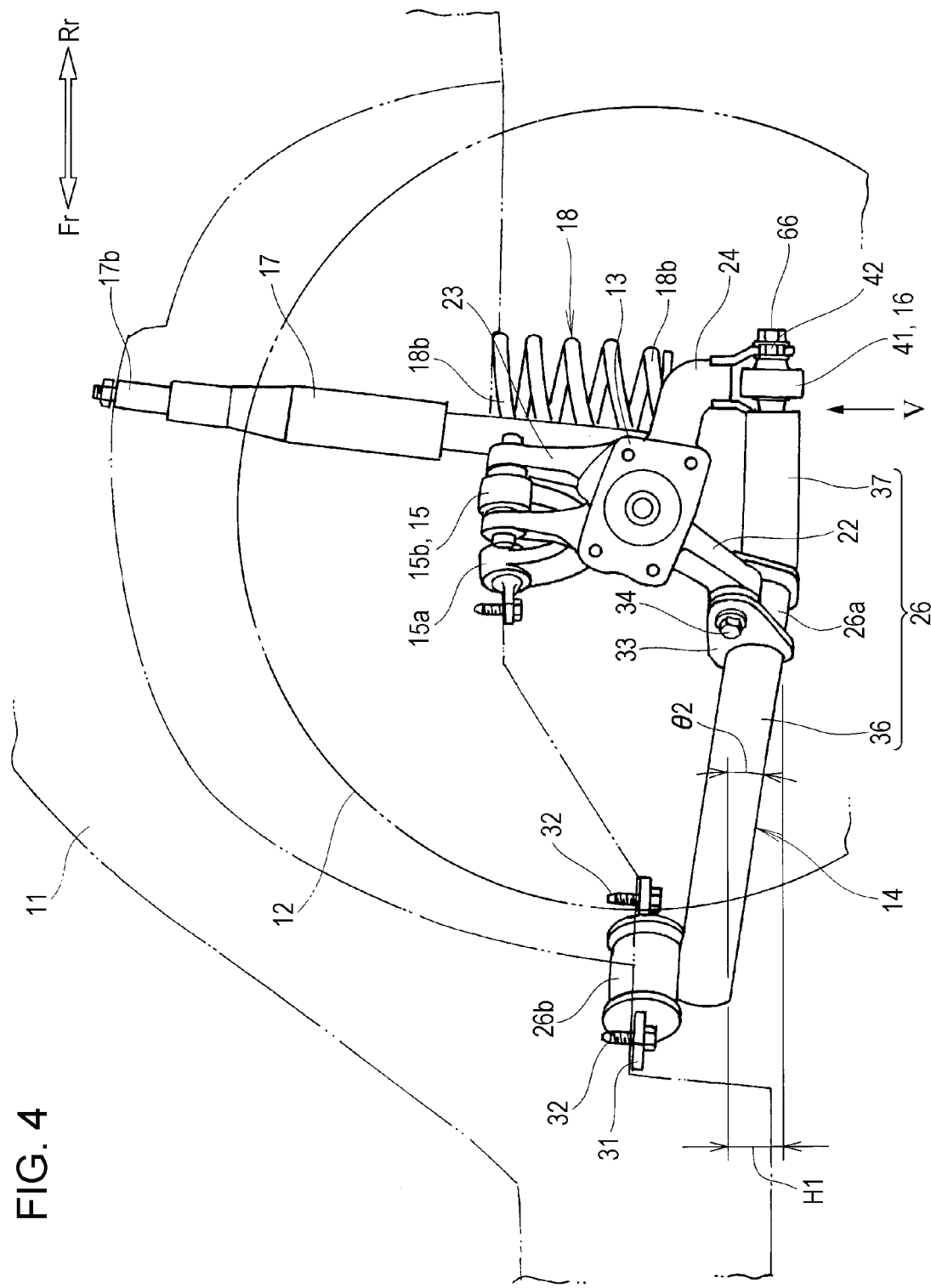
FIG. 4 illustrates the suspension apparatus in FIG. 1 viewed from the direction of arrow IV.
Figure 5:
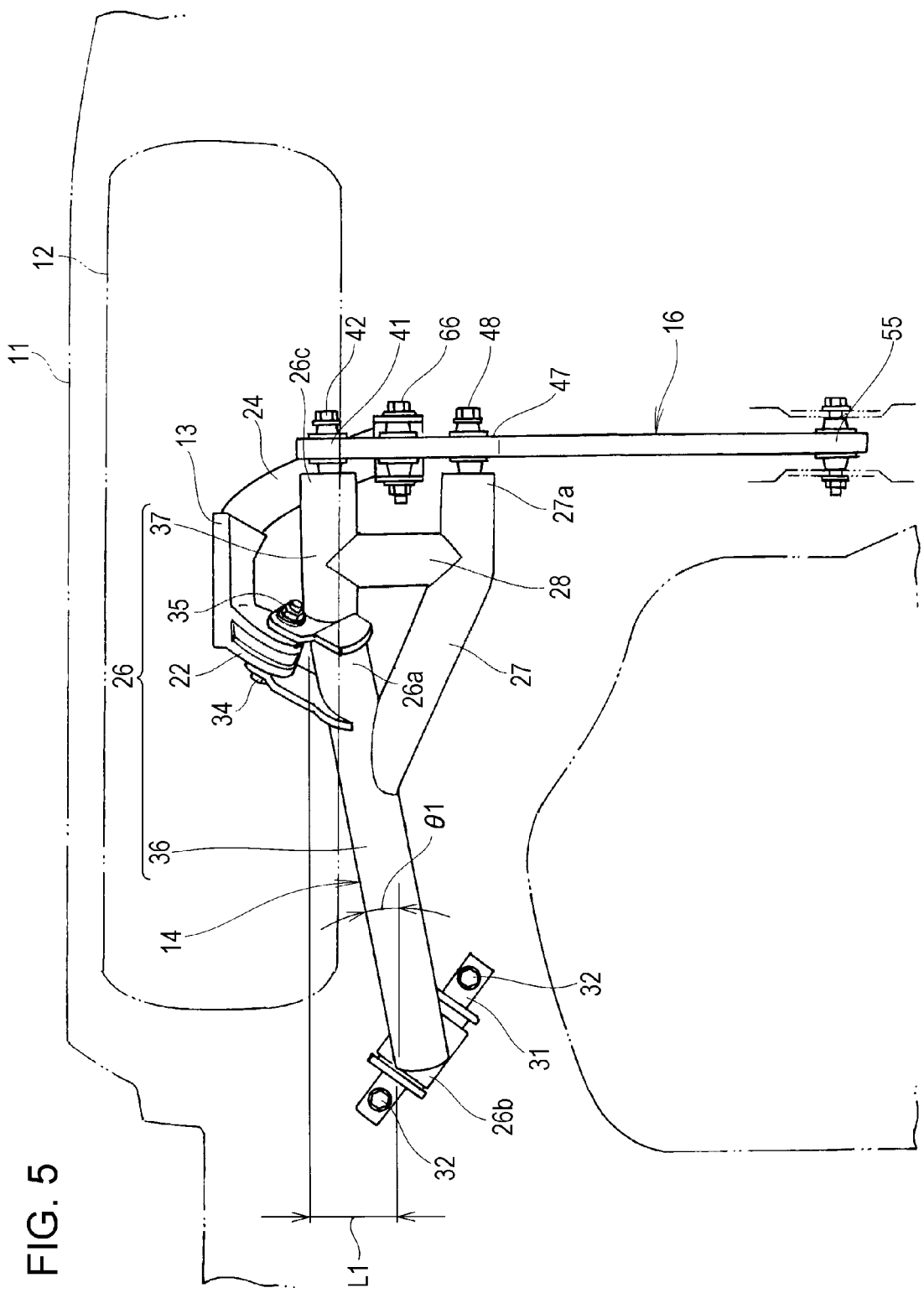
FIG. 5 illustrates the suspension apparatus in FIG. 1 viewed from the direction of arrow V.

As illustrated in FIGS. 4 and 5, the main center section 26a of the main arm 26 (i.e., the rear edge area of the main inclined part 36) is positioned outward in the vehicle width direction by a distance L1 from the main front end section 26b (see FIG. 5).

The lower front joining section 22 of the knuckle 13 is pivotally supported on the main center section 26a by the joining brackets 33.

The main center section 26a is positioned downward by a distance H1 from the main front end section 26b (see FIG. 4).

The section from the main front end section 26b to the main center section 26a of the main arm 26 extends rearward, inclines outward in the vehicle width direction at an inclination angle θ1, and inclines downward at an inclination angle θ2.

As illustrated in FIGS. 2 and 3, the subarm 27 branches from the main center section 26a of the main arm 26. A sub rear end section 27a of the subarm 27 is attached to a second outer end section 47 of the lower arm 16 with a second bolt 48.

The second outer end section 47 is closer to an inner end section 55 of the lower arm 16 than the first outer end section 41 by a distance L2.

The lower end section 17a of the damper 17 is pivotally supported at sub-rear-end-section vicinity 27b of the subarm 27. The upper end section 17b of the damper 17 is attached to the vehicle body 11.

The lower end section 18a of the suspension spring 18 is supported on the sub rear end section 27a of the subarm 27. The upper end section 18b of the suspension spring 18 is supported by the vehicle body 11.

The upper arm 15 is disposed along the vehicle width direction. An inner end section 15a of the upper arm 15 is pivotally supported on the vehicle body 11 with a support shaft 61 and bolts 62. An outer end section 15b of the upper arm 15 is pivotally supported by the upper joining section 23 of the knuckle 13 with a support shaft 63.

Figure 6:
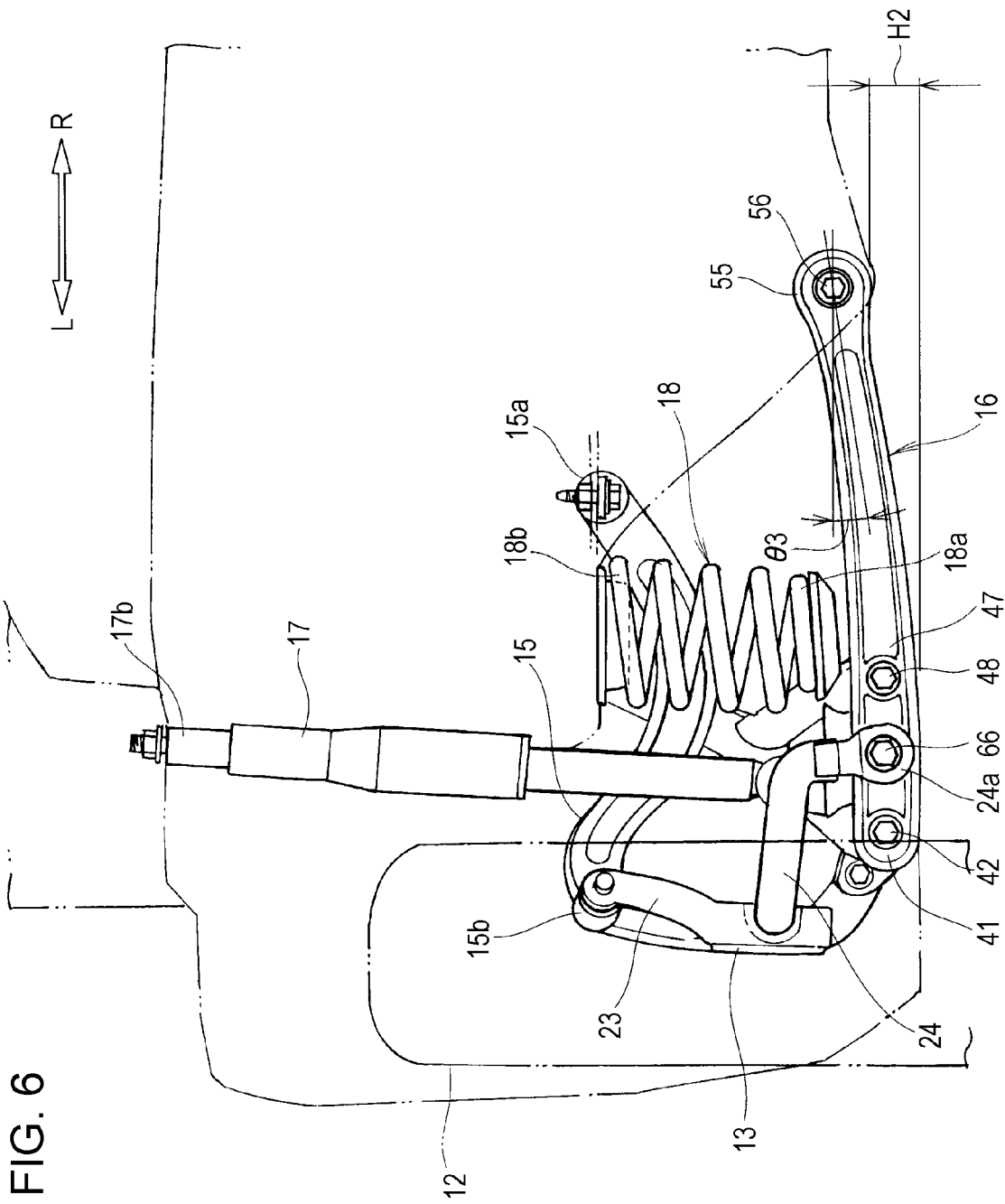
FIG. 6 illustrates the suspension apparatus in FIG. 1 viewed from the direction of arrow VI.

As illustrated in FIGS. 2 and 6, the first outer end section 41 of the lower arm 16 is attached to the main rear end section 26c of the main arm 26 with the first bolt 42. The second outer end section 47 of the lower arm 16 is attached to the sub rear end section 27a of the subarm 27 with the second bolt 48. The inner end section 55, which is provided further inward in the vehicle width direction than the outer end sections 41 and 47 is pivotally supported on the vehicle body 11 with a bolt 56.

Figure 7:
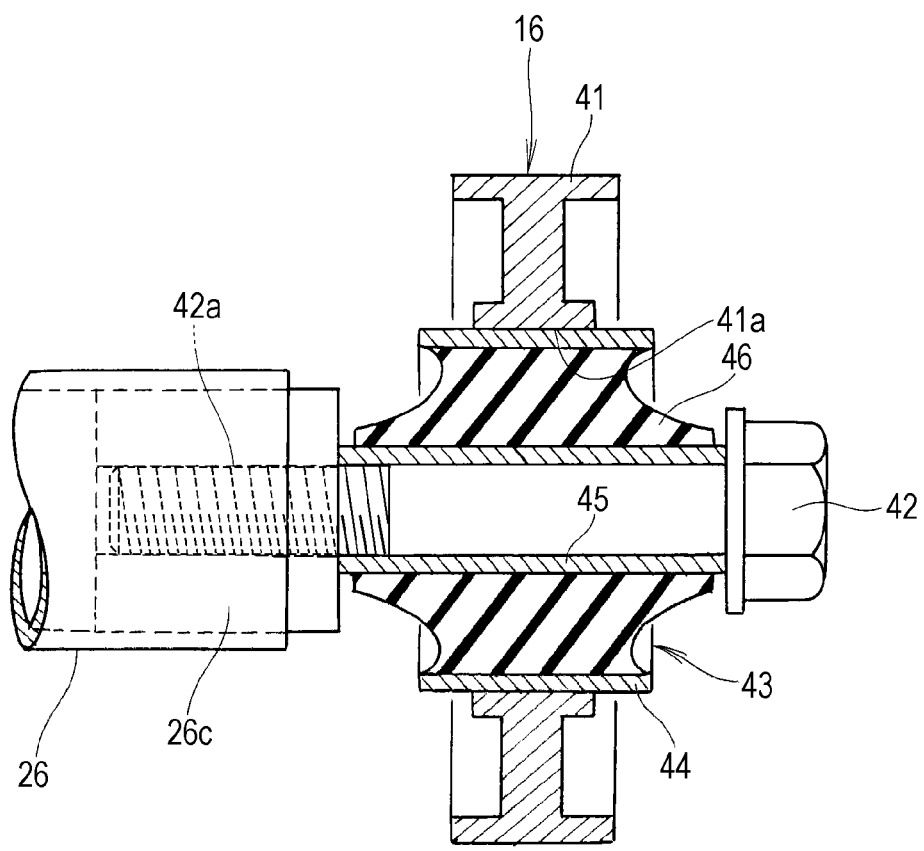
FIG. 7 is a sectional view taken along line VII-VII in FIG. 1.

As illustrated in FIG. 7, a first rubber bush (elastic joining section) 43 or, specifically, an outer cylinder 44 is fit into an attachment hole 41a in the first outer end section 41.

The first rubber bush 43 is disposed such that its axis is parallel to the front-to-rear direction of the vehicle. A bush member 46 of the first rubber bush 43 is interposed between the outer cylinder 44 and an inner cylinder 45.

The bush member 46 is made of elastically deformable rubber.

The first bolt 42 is passed through the inner cylinder 45 of the first rubber bush 43 such that the threads 42a of the first bolt 42 are screwed into the main rear end section 26c of the main arm 26. In this way, the first outer end section 41 is connected to the main rear end section 26c of the main arm 26 with the first rubber bush 43.

When load in the front-to-rear direction of the vehicle is applied to the main rear end section 26c, the bush member 46 elastically deforms to allow the main rear end section 26c to move in the front-to-rear direction of the vehicle.

As illustrated in FIG. 2, similar to the first outer end section 41, a second rubber bush (elastic joining section) 51 is passed through an attachment hole 47a in the second outer end section 47.

The second rubber bush 51 has the same configuration as the first rubber bush 43. Thus, the same reference numerals that are used for the first rubber bush 43 will be also used for the second rubber bush 51, and descriptions thereof will not be repeated.

Similar to the first rubber bush 43, the second rubber bush 51 is disposed such that its axis is parallel to the front-to-rear direction of the vehicle.

The second bolt 48 is passed through an inner cylinder 45 (not shown) of the second rubber bush 51, and threads 48a of the second bolt 48 protruding from the inner cylinder 45 are screwed into the sub rear end section 27a of the subarm 27.

The second outer end section 47 is attached to the sub rear end section 27a of the subarm 27 with the second rubber bush 51.

When load in the front-to-rear direction of the vehicle is applied to the sub rear end section 27a, a bush member 46 of the second rubber bush 51 elastically deforms to allow the sub rear end section 27a to move in the front-to-rear direction of the vehicle.

As illustrated in FIGS. 2 and 6, the first rubber bush 43 and the second rubber bush 51 are both disposed such that their axes are parallel to the front-to-rear direction of the vehicle and are disposed parallel to each other such that the distance between them in the vehicle width direction is equal to L2.

A knuckle pivot support part 65 of the lower arm 16, which is provided between the first rubber bush 43 and the second rubber bush 51, is attached to a rear end part 24a of the lower rear joining section 24.

The knuckle pivot support part 65 and the inner end section 55 of the lower arm 16 are disposed apart from each other by a knuckle pivot support distance L3. The first outer end section 41 and the inner end section 55 of the lower arm 16 are disposed apart from each other by a first outer end distance L4. By attaching the knuckle 13 to the knuckle pivot support part 65, which is provided between the first and second outer end sections 41 and 47 (i.e., between the first and second rubber bushes 43 and 51), the knuckle pivot support distance L3 is set smaller than the first outer end distance L4.

Figure 8:
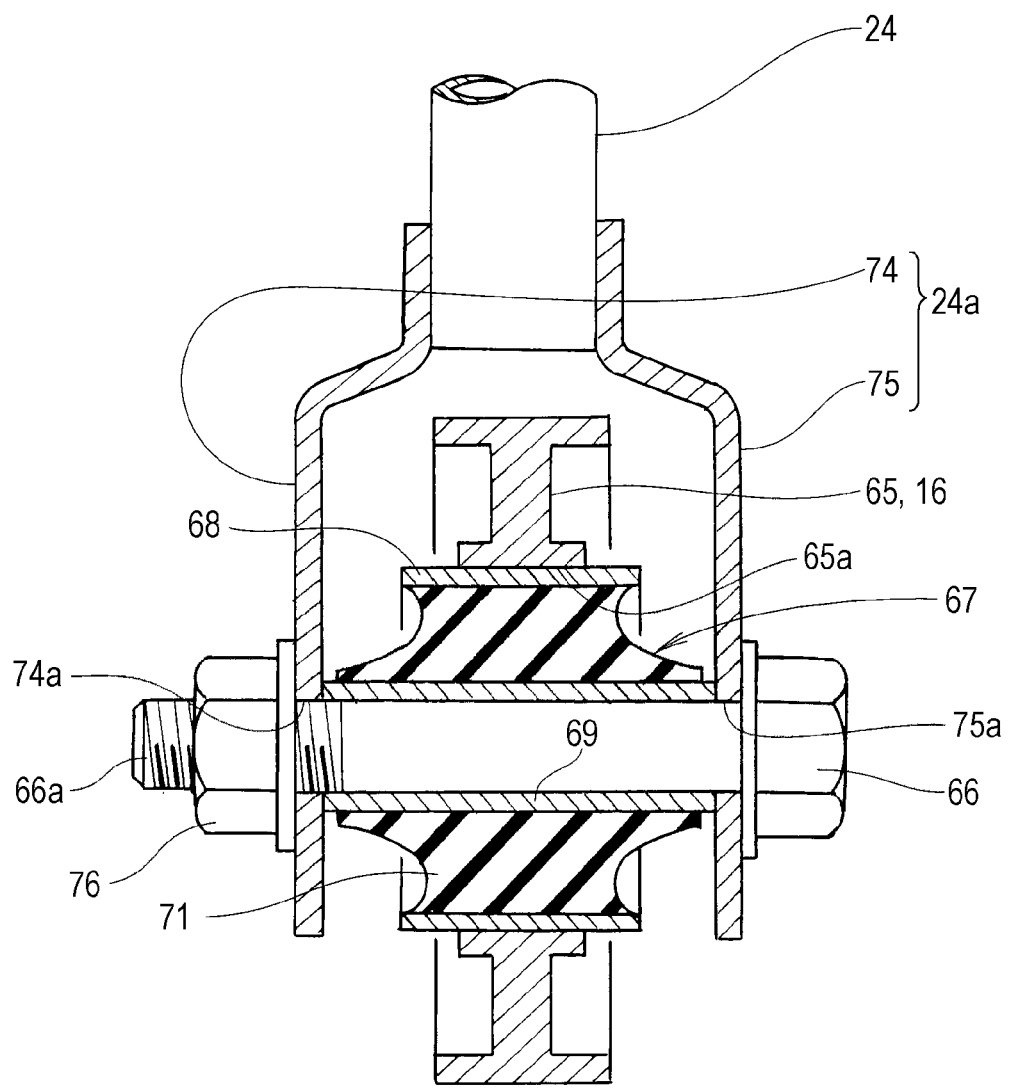
FIG. 8 is a sectional view taken along line VIII-VIII in FIG. 1.

As illustrated in FIG. 8, a pivot support rubber bush 67, specifically, an outer cylinder 68, is fit into an attachment hole 65a in the knuckle pivot support part 65.

Similar to the first and second rubber bushes 43 and 51, the pivot support rubber bush 67 is disposed such that its axis is parallel to the front-to-rear direction of the vehicle. A bush member 71 is interposed between the outer cylinder 68 and an inner cylinder 69.

The bush member 71 is made of elastically deformable rubber.

The rear end part 24a of the lower rear joining section 24 includes a front attachment bracket 74 and a rear attachment bracket 75, which are disposed apart from each other by a predetermined distance. An attachment hole 74a is formed in the front attachment bracket 74, and an attachment hole 75a is formed in the rear attachment bracket 75.

With the knuckle pivot support part 65 (i.e., pivot support rubber bush 67) interposed between the front and rear attachment brackets 74 and 75, the attachment hole 74a in the front attachment bracket 74, the attachment hole 75a in the rear attachment bracket 75, and the inner cylinder 69 are coaxially disposed.

A pivot support bolt 66 is passed through the attachment holes 74a and 75a and the inner cylinder 69. A nut 76 is screwed onto threads 66a protruding from the attachment hole 74a in the front attachment bracket 74.

The knuckle pivot support part 65 is connected to the rear end part 24a of the lower rear joining section 24 with the pivot support rubber bush 67.

When load in the front-to-rear direction of the vehicle is applied to the lower rear joining section 24 (rear end part 24a), a bush member 71 of the pivot support rubber bush 67 elastically deforms to allow the lower rear joining section 24 (rear end part 24a) to move in the front-to-rear direction of the vehicle.

As illustrated in FIG. 6, the first and second outer end sections 41 and 47 of the lower arm 16 are disposed downward of the inner end section 55 by a distance H2.

The lower arm 16 extends outward in the vehicle width direction from the inner end section 55 to the first and second outer end sections 41 and 47 and inclines downward at an inclination angle θ3.

The first and second outer end sections 41 and 47 and the knuckle pivot support part 65 are disposed substantially horizontally.

Ride comfort and driving stability of a vehicle having the suspension apparatus 10 will be described below with reference to FIGS. 9A, 9B, and 9C.

As illustrated in FIGS. 9A, 9B, and 9C, the first outer end section 41 of the lower arm 16 is attached to the trailing arm 14 (main rear end section 26c) with the first rubber bush 43.

The second outer end section 47 of the lower arm 16 is attached to the trailing arm 14 (sub rear end section 27a) with the second rubber bush 51 (see FIG. 2).

The knuckle pivot support part 65 of the lower arm 16 between the first and second outer end sections 41 is attached to the knuckle 13 (rear end part 24a of the lower rear joining section 24) with the pivot support rubber bush 67.

When load in the front-to-rear direction of the vehicle is applied to the trailing arm 14 and the knuckle 13, the first and second rubber bushes 43 and 51 (bush member 46) and the support rubber bush 67 (bush member 71) can be elastically deformed.

Thus, when, for example, the wheel 12 runs over a bump while driving the vehicle, the first and second rubber bushes 43 and 51 (bush member 46) and the pivot support rubber bush 67 (bush member 71) elastically deform in the front-to-rear direction of the vehicle.

In this way, for example, when the wheel 12 runs over a bump, elastic compliance in the front-to-rear direction of the vehicle (allowing deformation and displacement to a certain degree for an input) can be ensured, improving the ride comfort.

As illustrated in FIG. 9A, the knuckle 13 (specifically, the rear end part 24a of the lower rear joining section 24) is attached to the section between the first and second outer end sections 41 and 47 of the lower arm 16.

Thus, by restricting the movement of the knuckle 13 (i.e., wheel 12) in the vehicle width direction with the lower arm 16, rigidity in the vehicle width direction can be increased.

In this way, toe (toe angle) and camber (camber angle) of the wheel 12 can be suitably maintained while driving the vehicle, improving driving stability.

The durability of the first and second rubber bushes 43 and 51 of the suspension apparatus 10 will be described below with reference to FIGS. 10A, 10B, and 11.

Figure 10A:
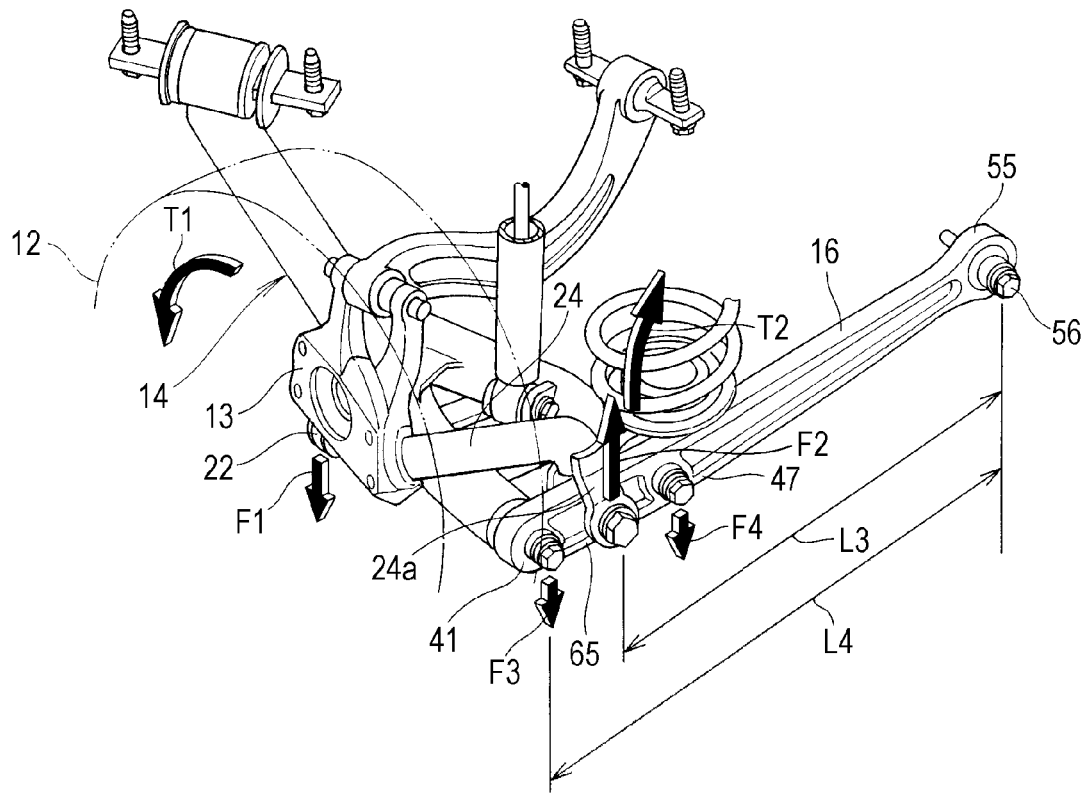
FIGS. 10A and 10B illustrate the durability of the rubber bushes of first and second outer end sections of a suspension apparatus according to the embodiment of the present invention.

As illustrated in FIG. 10A, the knuckle 13 (specifically, the rear end part 24a of the lower rear joining section 24) is attached to the knuckle pivot support part 65, which is provided between the first and second outer end sections 41 and 47 of the lower arm 16.

By attaching the knuckle 13 to the knuckle pivot support part 65, which is provided between the first and second outer end sections 41 and 47, the knuckle pivot support distance L3 can be set small.

Figure 10B:
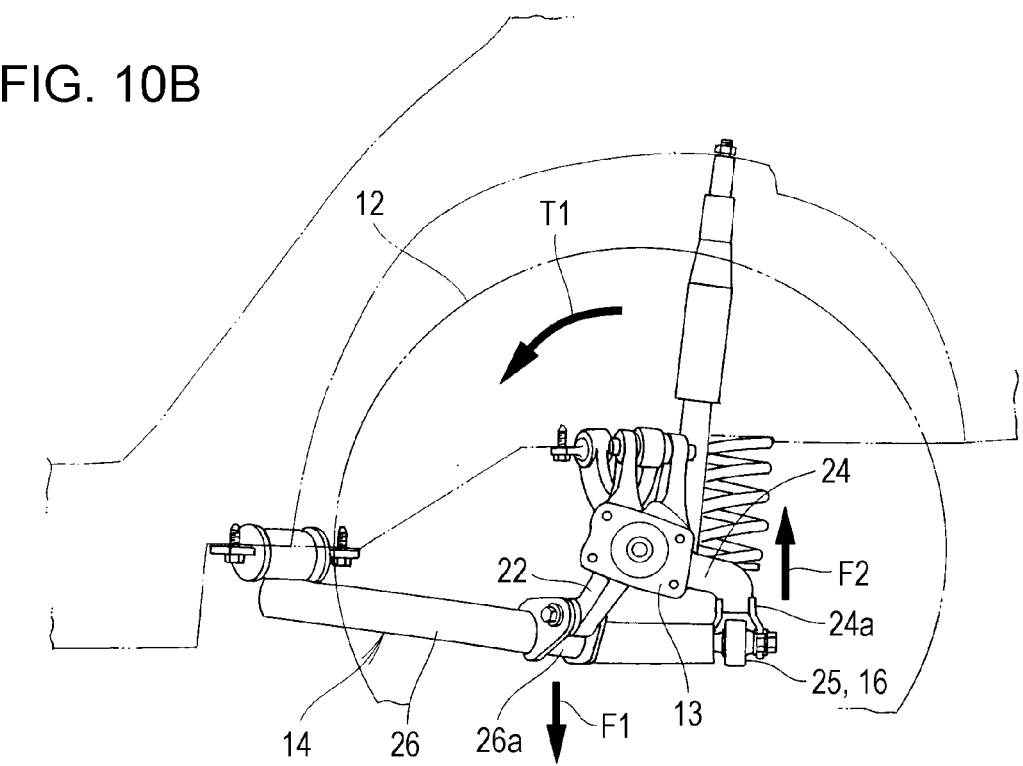

As illustrated in FIG. 10B, braking torque (moment) T1 is applied to the knuckle 13 while applying brake to the wheel 12 (applying brake during forward driving) in the direction indicated by the arrow.

As a result of the braking torque T1 being applied to the knuckle 13, load F1 is applied to the main center section 26a in the direction of the arrow (downward), and load F2 is applied to the knuckle pivot support part 65 in the direction of the arrow (upward).

As illustrated in FIG. 10A, as a result of the load F2 being applied to the knuckle pivot support part 65, torque (moment) T2 (F2×L3) is generated around the axis, i.e., the bolt 56.

The knuckle pivot support distance L3 is set smaller than the first outer end distance L4.

The torque T2 applied to the knuckle pivot support part 65 can be set small compared with the torque applied when the load F2 is applied to the first outer end section 41.

Thus, the small torque T2 is applied to the knuckle pivot support part 65 can be canceled out by the small load F3 applied to the first rubber bush 43 and the small load F4 applied to the second rubber bush 51.

In this way, the first and second rubber bushes 43 and 51 can be prevented from being damaged by the load F3 and F4, respectively, and thus, the durability of the first and second rubber bushes 43 and 51 can be improved.

Figure 11:
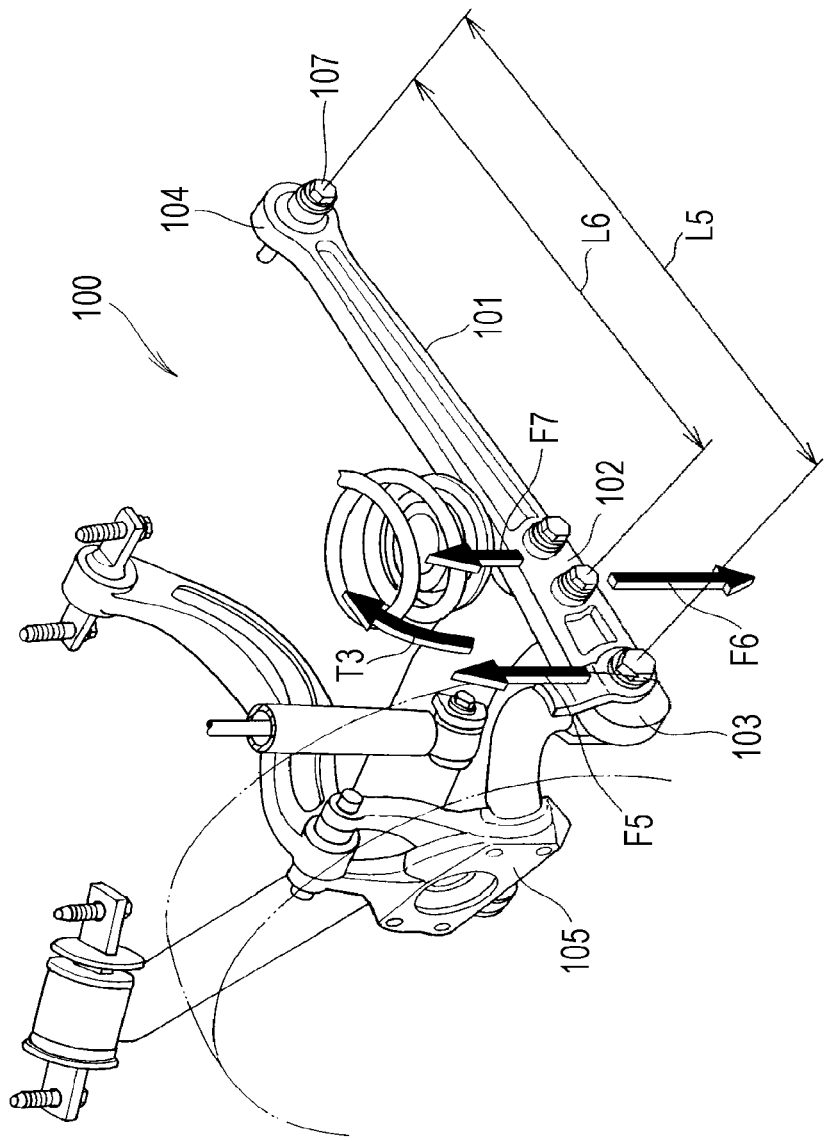
FIG. 11 illustrates a case in which large load acts on the first and second rubber bushes of a suspension apparatus according to a comparative example.

FIG. 11 illustrates a case in which large load is applied to first and second rubber bushes of a suspension apparatus 100 according to a comparative example.

As illustrated in FIG. 11, in the suspension apparatus 100, first and second outer end sections 102 of a lower arm 101 extends outward of the vehicle, and a knuckle 105 is attached to a knuckle pivot support section 103 further extended from the outer end section 102.

However, when the knuckle 105 is attached to the knuckle pivot support section 103, the knuckle pivot support distance L5 from the knuckle pivot support section 103 to an inner end section 104 of the lower arm 101 is set larger than a first outer end distance L6 from the first outer end section 102 to the inner end section 104 of the lower arm 101.

Thus, when load F5 is applied to the extending sections through the knuckle while applying brake to the wheel (applying brake during forward driving), relatively large torque (moment) T3 (F5×L5) is generated around the axis, i.e., bolt 107.

To cancel out this relatively large torque T3, relatively large load F6 is applied to the first outer end section 102 and relatively large load F7 is applied to the second outer end section 102.

Thus, to maintain the durability of the rubber bushes of the first and second outer end sections 102, the quality of the rubber bushes must be increased more than necessary and/or the fastening toughness (toughness, rigidity) must be increased by increasing the size (shape) of the bolts.

Driving stability while applying brake to the wheel 12 of the suspension apparatus 10 will be described below with reference to FIGS. 12A, 12B, and 13.

Figure 12A:
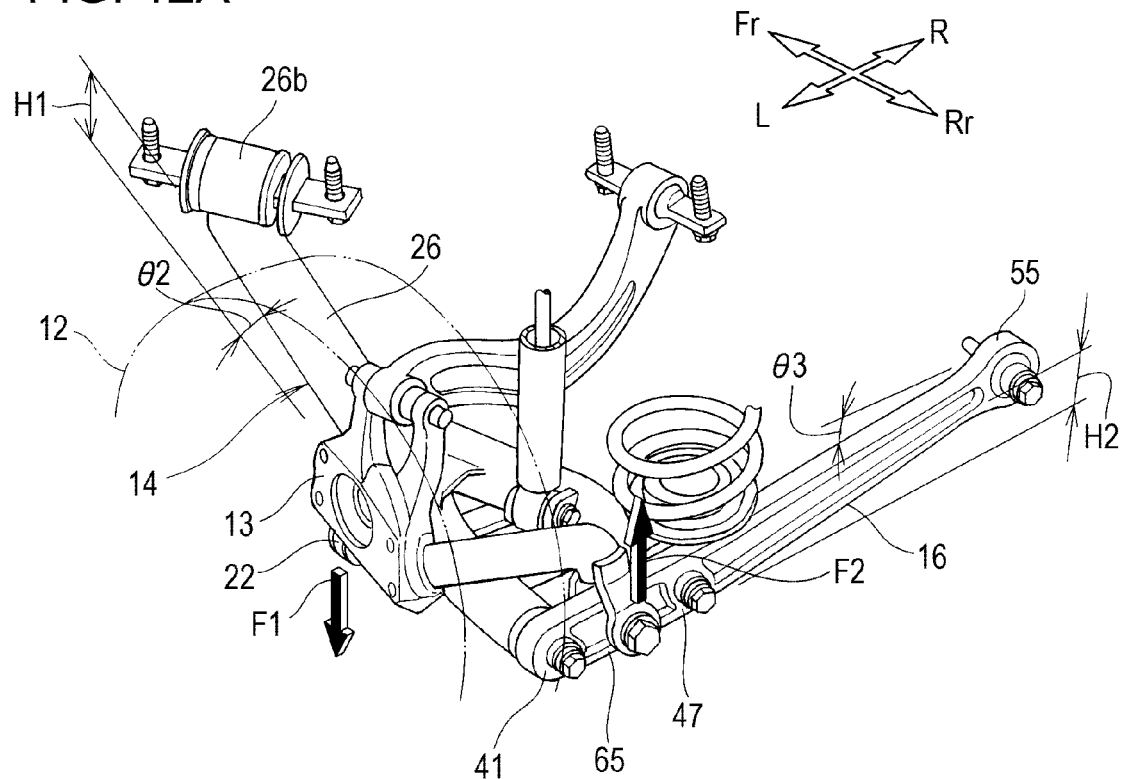
FIGS. 12A and 12B illustrate a case in which brake is being applied to a wheel of a suspension apparatus according to the embodiment of the present invention.
Figure 12B:
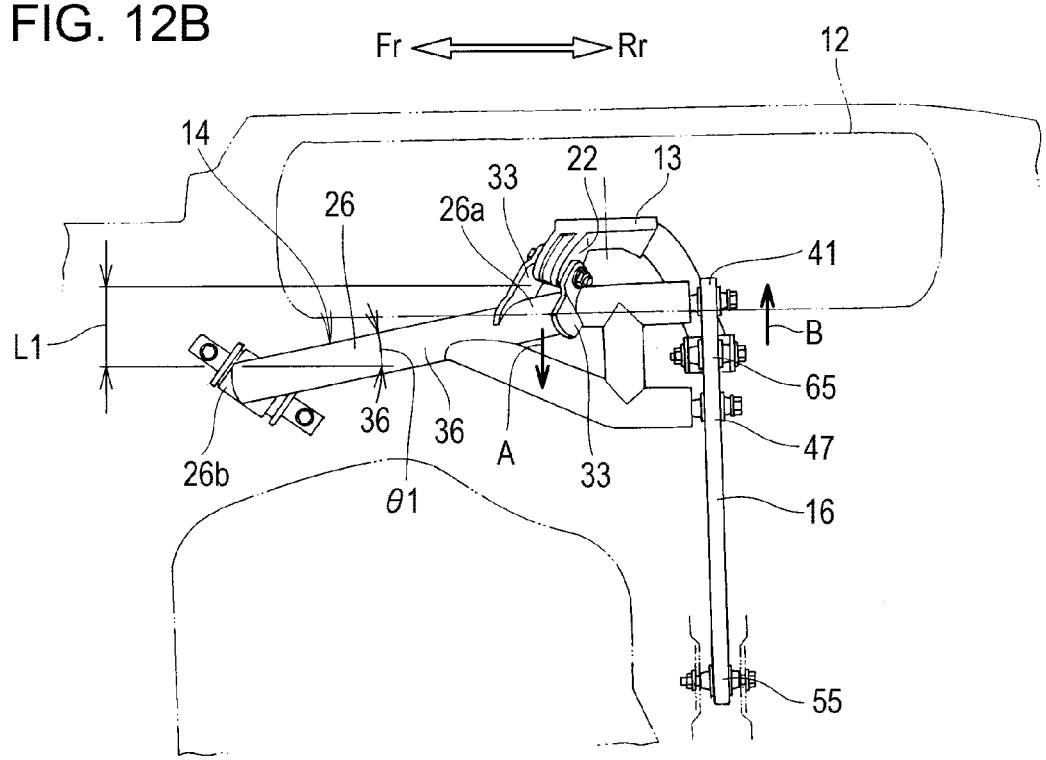

As illustrated in FIGS. 12A and 12B, the main center section 26*a* (i.e., rear edge area of the main inclined part 36) is disposed outward in the vehicle width direction from the main front end section 26*b* of the main arm 26 by a distance L1.

The lower front joining section 22 of the knuckle 13 is pivotally supported on the main center section 26*a* with the joining brackets 33.

The main center section 26*a* is disposed downward from the main front end section 26*b* by a distance H1.

The main arm 26 extends rearward from the main front end section 26*b* to the main center section 26*a* and inclines outward in the vehicle width direction at an inclination angle θ1 and downward at an inclination angle θ2.

The first and second outer end sections 41 and 47 of the lower arm 16 are disposed downward from the inner end section 55 by a distance H2.

The lower arm 16 extends outward in the vehicle width direction from the inner end section 55 to the first and second outer end sections 41 and 47 and inclines downward at an inclination angle θ3.

When brake is applied to the wheel 12 while driving the vehicle (applying brake during forward driving), the downward load F1 is applied to the main center section 26*a*, and the upward load F2 is applied to the knuckle pivot support part 65 of the lower arm 16.

In this way, by applying the downward load F1 to the main center section 26*a* while the main center section 26*a* is positioned downward by a distance H1 and outward in the vehicle width direction by a distance L1 from the main front end section 26*b*, the main center section 26*a* moves (is displaced) inward in the vehicle width direction as indicated by arrow A.

By applying the upward load F2 to the knuckle pivot support part 65 while the first and second outer end sections 41 and 47 of the lower arm 16 are disposed downward from the inner end section 55 by a distance H2, the first and second outer end sections 41 and 47 move (are displaced) outward in the vehicle width direction as indicated by arrow B.

As illustrated in FIG. 13, as a result of the main center section 26*a* moving (being displaced) inward in the vehicle width direction as indicated by arrow A and the first and second outer end sections 41 and 47 moving (being displaced) outward in the vehicle width direction as indicated by arrow B, the toe-in state of the wheel 12 can be maintained while brake is applied.

By maintaining such a toe-in state of the wheel 12, excellent driving stability while braking can be ensured.

The present invention is not limited to the embodiment described above, and various modifications may be included within the scope of the invention.

For example, in the embodiment described above, the suspension apparatus 10 is applied to a rear suspension apparatus, but this is not limited thereto. Instead, the suspension apparatus 10 may be applied to a front suspension apparatus.

The shapes and configurations of the suspension apparatus 10, the vehicle body 11, the wheel 12, the knuckle 13, the trailing arm 14, the lower arm 16, the main center section 26*a*, the first outer end section 41, the first rubber bush 43, the second outer end section 47, the second rubber bush 51, and the inner end section 55 are not limited to those described in the embodiment and may be changed appropriately.

The embodiment of the present invention can be suitably applied to an automobile having a suspension apparatus including a knuckle, which supports a wheel in a freely rotating manner and which is supported on a vehicle body with a trailing arm and a lower arm.

According to the embodiment of the present invention, an outer end section of a second suspension arm is attached to a first suspension arm with elastic joining sections disposed parallel to each other in the vehicle width direction.

By disposing the elastic joining sections parallel to each other in the vehicle width direction the axes of the elastic joining sections are disposed along the front-to-rear direction of the vehicle. Thus, elastic deformation of the elastic joining sections in the front-to-rear direction of the vehicle is allowed, and elastic compliance in the front-to-rear direction of the vehicle (allowing deformation and displacement to a certain degree for an input) can be ensured.

In this way, for example, when the wheel runs over a bump, elastic compliance in the front-to-rear direction of the vehicle can be ensured to improve the ride comfort.

A knuckle is attached to the second suspension arm at a section between the elastic joining sections.

Accordingly, movement of the knuckle in the vehicle width direction is restricted to increase the rigidity in the vehicle width direction.

In this way, the toe (toe angle) and the camber (camber angle) of the wheel can be suitably maintained while driving the vehicle, and driving stability can be improved.

To restrict the movement of the knuckle in the vehicle direction, the outer end section of the second suspension arm can be extended outward of the vehicle, and the knuckle can be attached to a joining section further extended from the outer end section.

When the knuckle is attached to the joining section extended outward of the vehicle, the distance between the inner end section of the second suspension arm and the joining section increases.

Thus, when load is applied to the joining section via the knuckle when the braking the wheel, relatively large torque (moment) is applied to the joining section.

To cancel out this torque, relatively large load is applied to the elastic joining sections.

Therefore, for example, to maintain the durability of the elastic joining sections, the quality of the elastic joining sections must be increased more than necessary and/or the fastening toughness (tightening reliability) must be increased by increasing the size (shape) of the bolts.

Accordingly, in the embodiment of the present invention, the knuckle is attached to the second suspension arm at a section between the elastic joining sections.

Hereinafter, the section between the elastic joining sections to which the knuckle is attached is referred to as "knuckle pivot support part."

By attaching the knuckle to the knuckle pivot support part between the elastic joining sections, the distance between the knuckle pivot support part and the inner end section of the second suspension arm can be decreased.

Thus, when load is applied to the knuckle pivot support part via the knuckle while braking the wheel, the torque applied to the knuckle pivot support part can be reduced.

Since small torque applied to the knuckle pivot support part can be cancelled out by small load applied to the elastic joining sections, the durability of the elastic joining section can be increased.

According to the embodiment of the present invention, a section of the first suspension arm provided outward in the vehicle width direction (hereinafter referred to as "outer section") is disposed further downward and outward in the vehicle width direction than the front end section.

The outer end section of the second suspension arm is disposed further downward than the inner end section.

When brake is applied to the wheel while driving, downward load is applied to the outer section of the first suspension arm, and upward load is applied to the outer end section of the second suspension arm.

In this way, by applying the downward load to the outer section of the first suspension arm while the outer section is positioned further downward and outward in the vehicle width direction than the front end section, the outer section moves (is displaced) inward in the vehicle width direction.

By applying the downward load to the outer section of the first suspension arm while the outer section is positioned further downward and outward in the vehicle width direction than the front end section, the outer section moves (is displaced) inward in the vehicle width direction.

Since the toe-in state of the wheel can be maintained while braking, the driving stability while braking can be suitably maintained.

Obviously, numerous modifications and variations of the present invention are possible in light of the above teachings. It is therefore to be understood that within the scope of the appended claims, the invention may be practiced otherwise than as specifically described herein.

What is claimed is:

1. A suspension apparatus comprising:
    a first suspension arm having a front end section pivotally supported on a vehicle body, the first suspension arm extending toward a rear of a vehicle from the front end section;
    a second suspension arm having an outer end section and an inner end section, the outer end section being attached to the first suspension, the inner end section being disposed at an inner side of the outer end section in a vehicle width direction and pivotally supported on the vehicle body;
    an elastic joining section provided on the second suspension arm and connecting the second suspension arm to the first suspension arm with a plurality of elastic bodies disposed substantially in parallel in the vehicle width direction; and
    a knuckle supported by the first suspension arm and the wheel and supported between the plurality of elastic bodies.

2. The suspension apparatus according to claim 1,
    wherein a section of the first suspension arm disposed at an outer side of the front end section in the vehicle width direction is pivotally supported on the knuckle, and
    wherein the first suspension arm includes a bifurcated section having two branches extending from a center section of the first suspension arm to the rear of the vehicle, and a rear end section of each of the branches is attached to the second suspension arm with the elastic joining section.

3. The suspension apparatus according to claim 1,
    wherein the knuckle comprising:
        a knuckle main body; and
        a lower rear joining section extending from the knuckle main body inward in the vehicle width direction and toward the rear of the vehicle, the lower rear joining section being supported by the second suspension arm between the plurality of elastic bodies.

4. The suspension apparatus according to claim 1,
    wherein a section of the first suspension arm pivotally supported on the knuckle is disposed at an outer side of the front end section in the vehicle width direction and is disposed at a lower side of the front end section, and
    wherein the outer end section of the second suspension arm attached to the first suspension arm is provided at a location lower than a location of the inner end section pivotally supported on the vehicle body.

* * * * *